Inventor
Toshihiko Numakura

Inventor
Toshihiko Numakura

United States Patent Office 3,324,414
Patented June 6, 1967

3,324,414
FREQUENCY MODULATION CIRCUIT WITH REDUCED AMPLITUDE MODULATION AND SIDE BAND COMPONENTS

Toshihiko Numakura, Nerima-ku, Tokyo, Japan, assignor to Sony Corporation, Tokyo, Japan, a corporation of Japan Filed Dec. 30, 1963, Ser. No. 334,422
4 Claims. (Cl. 332—23)

This invention relates to a freqency modulation circuit, and more particularly to a frequency modulation circuit which may be applied to video tape recorders. According to this invention, a frequency modulated signal may be obtained having a smaller amplitude modulation component (AM component), and a superfluous side-band wave in the frequency modulated signal may also be removed; thus a frequency modulated signal having a minimum of spurious components may be obtained.

Accordingly, one object of this invention is to provide a frequency modulation circuit in which a frequency modulated signal having a carrier of low frequency, such as 2 mc./s., may be obtained.

Another object of this invention is to provide a frequency modulation circuit in which two variable frequency oscillators are provided whose center oscillation frequencies are different from each other, and whose said oscillation frequencies are deviated respectively higher and lower than their fundamental undeviated oscillation frequencies in response to an inpet signal; whereby two frequency modulated signals are obtained from the two oscillators and these signals are mixed to produce a final frequency modulated signal which is the difference between the above two signals. In this way sensitivity for frequency modulation is greatly increased and frequency modulation of good linearity is effected.

Another object of this invention is to provide a frequency modulation circuit in which two variable frequency oscillators including variable capacity elements are provided, and the capacities of the variable capacity elements are respectively varied by a video signal to obtain an oscillation frequency signal in accordance with the video signal, namely a frequency modulated signal. Thus the non-linear characteristic caused by the use of only a single variable capacity element, as in heretofore known modulators, is completely compensated.

Another object of this invention is to provide such a frequency modulation circuit in which a video signal is arranged to be applied to a variable capacity element through a resonance circuit tuned to a frequency equal to center frequency of the oscillator and an undesired side-band wave of an input signal is filtered out by such resonance circuit.

A further object of this invention is to provide a circuit in which two frequency modulated signals are produced by two variable frequency oscillators and they are mixed by a transistor to produce a low carrier frequency modulated signal, and band-pass filters are provided at the output sides of the variable frequency oscillators. Thus second or higher harmonic waves and second or higher-order side band waves in the frequency modulated signal may be removed. That is, when obtaining a low frequency modulated signal by mixing, spurious modulation products are prevented from appearing in the output signal.

Yet a further object of this ivention is to provide a transistorized modulator which is simple in construction and of small power consumption.

Other objects, features and advantages of this invention will become apparent from the following description taken in conjunction with the accompanying drawings, in which.

Figure 1:
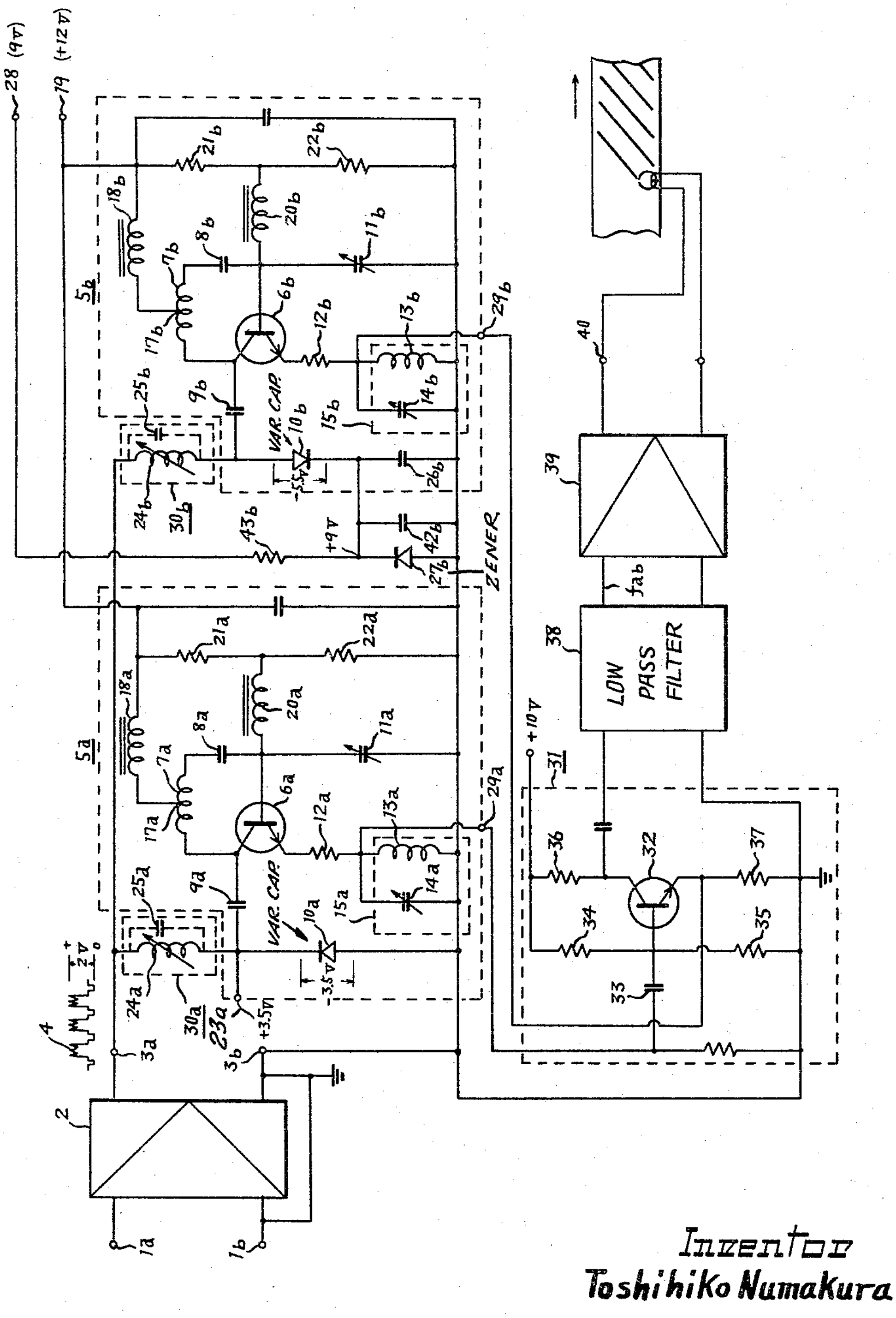
FIGURE 1 is a circuit diagram illustrating an example of the frequency modulation circuit according to this invention.

Referring to FIGURE 1, 1A and 1B are video input signal terminals and 2 is a video amplifier. Between output terminals 3*a* and 3*b* of the amplifier 2, there is a positive-polarity video signal 4 of maximum peak to peak voltage (the level of a synchronizing pulse being at low voltage), for example of 2 v.

At the output of the video amplifier 2 are provided two variable frequency oscillation circuits, namely frequency modulation circuits designated by numerals 5*a* and 5*b*. The variable frequency oscillation circuit 5*a* is provided with a transistor 6*a*, its collector being connected to the base through an inductor 7*a* having an inductance of, for instance 0.79 micro henry and a capacitor 8*a* having a capacitance of, for example 50.0 pf. and being grounded through a capacitor 9*a* of 50.0 pf. and a semiconductor diode type variable capacity element (varactor) 10*a* usually referred to by the trademark "Vari-Cap," while its base is grounded through a variable capacitor 11*a* having a capacitance of, for example 25 pf. at maximum; its emitter being also grounded through a resistor 12*a* and a band-pass filter 15*a* composed of an inductor 13*a* and a capacitor 14*a*. It is known that the variable capacity element 10*a* has a characteristic relationship of capicitance C*a* to bias voltage V*a* such as shown by the curve 16*a* in FIGURE 2A. The band-pass filter 15*a* has the band-pass characteristic of, for instance from 50.0 mc./s. to 55.0 mc./s., though this will be clarified later herein.

The mid-point 17*a* of the inductor 7*a* is connected through a high-frequency choke coil 18*a* to a DC voltage terminal 19 of +12 v., and the base is connected through a high-frequency coil 20*a* to the connecting mid-point of voltage-divider resistors 21*a* and 22*a* connected between the DC voltage terminal 19 and ground. A bias voltage of, for example —3.5 v. is applied across the variable capacity element 10*a* in the reverse direction. 23*a* is a bias supply power source terminal.

The oscillation circuit 5*a* is a Colpitts or Clapp type oscilaltion circuit, which is so formed as to oscillate at a standard frequency $f_{a1}$ of, for instance 52.2 mc./s. by adjusting the capacitance of the capacitor 11*a* when there are no input signals. An output terminal 3*a* of the video amplifier 2 is connected to the variable capacity element 10*a* through an inductor 24*a* having an inductance of, for example 1μh. Together with its stray capacity 25*a*, the inductor 24*a* forms a resonance circuit 30*a* which substantially resonates to the center oscillation frequency $f_{a1}$ ($f_{a1}$=52.2 mc./s.) of the oscillator 5*a*.

The other variable frequency oscillation circuit 5*b* is substantially the same as the aforesaid variable frequency oscillation circuit 5*a*. Accordingly, parts corresponding to those of the circuit 5*a* are marked with the same reference numerals with the suffix *b* instead of the suffix *a*, and to that extent further detailed explanation will not be necessary. It must be noted however that in this case the anode of the variable capacity element 10*b* has been connected through a resonance circuit 30*b* to the terminal 3*a*, and its cathode has been grounded through a capacitor 42*b*.

Connected in parallel to a charging capacitor 26*b* is a Zener diode 27*b*, to which a DC voltage source 28 is connected. Thus, if a constant voltage of, for example 9 v. is applied across the charging capacitor 26*b*, a stable bias voltage of say −5.5 v. with reverse direction is applied across the variable capacity element 10*b*. Furthermore, the capacitance of the capacitor 11*b* is so adjusted that the center oscillation frequency $f_{b1}$ of the variable frequency oscillation circuit 5*b* is selected to be, for instance 50.0 mc./s. Therefore, the resonant frequency of the resonance circuit 30*b* formed by the inductor 24*b* is also selected at about 50.0 mc./s. In FIGURE 2B, 16*b* is a curve of the capacitance C*b* of the variable capacity element 10*b* in relation to the voltage (−V*b*).

Operation of the aforementioned variable frequency oscillator, namely the frequency modulation circuit 5*a*, will now be explained. When a signal 4 of a maximum peak to peak value of, for example, 2 v. with positive polarity is applied to the variable capacity element 10*a* as described above, there is obtained at the output terminal of the band-pass filter 15*a* an oscillation frequency $f_{a1}$ of 52.2 mc./s. at the peak level of a synchronizing pulse, and an oscillation frequency $f_{a2}$ of, for example 52.9 mc./s. is obtained at a maximum value 2 v. of white level of the video signal. This relation will be understood from the curve 16*a* of the voltage (−) $V_a$ against the frequency $f$ in FIGURES 2A. Consequently the oscillation frequency of the variable frequency oscillator 5*a* is deviated from 52.2 mc./s. to 52.9 mc./s. in response to the input video signal.

In the other variable frequency oscillator 5*b*, there are produced an oscillation frequency $f_{b1}$ of 50.0 mc./s. at the peak level of the video signal 4, and an oscillation frequency $f_{b2}$ of 49.3 mc./s. at the maximum value of 2 v. of white level; that is, the oscillation frequency is deviated from 50.0 mc./s. to 49.3 mc./s. in accordance with the input signal. This relation will be apparent from the curve 16*b* of the voltage (—) $V_b$ against the frequency $f_b$ in FIGURE 2B.

Figure 2A:
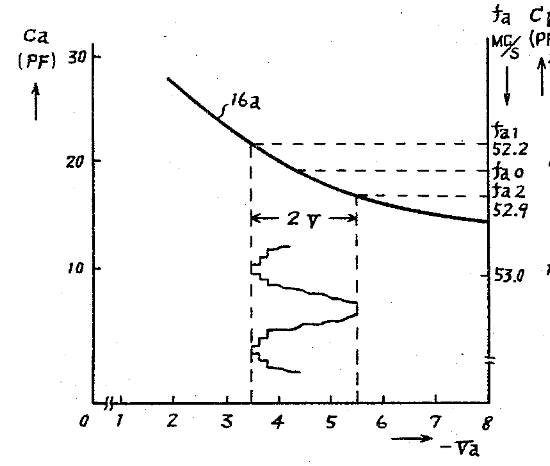
FIGURES 2A and 2B are graphs illustrating the relations of capacitance and oscillation frequency to the bias voltage of a variable capacity element.
Figure 2B:
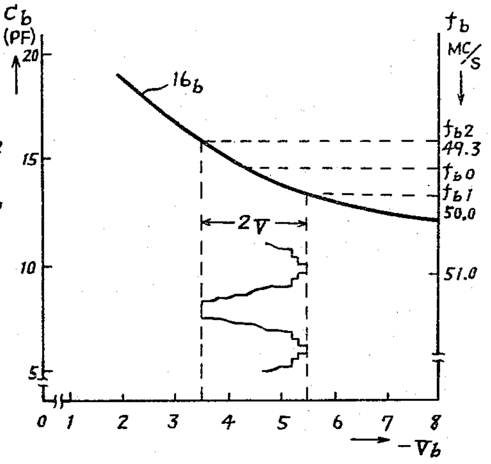

In this case, as is apparent from FIGURE 2A, the capacitance C*a* of the variable capacity element 10*a* decreases with an increase in the voltage of the video signal 4, and as the result the oscillation frequency $f_a$ of the variable frequency oscillator 5*a* increases. However, it must be noticed that such decrease in the capacitance C*a* causes a decrease in the oscillation output voltage or power of the transistor 6*a*. Accordingly, the frequency modulated output signal $f_a$ of the variable frequency oscillator 5*a* will include a component having amplitude-modulation in response to the voltage of the video signal 4. On the other hand, however, the frequency $f_a$ vs. the impedance characteristic of the resonant circuit 30*a* composed of the inductor 24*a* and stray capacitance 25*a* is such that as the oscillation frequency $f_a$ becomes higher than the resonance frequency $f_{a1}$, its effective capacitance increases. Therefore the impedance between the collector and emitter of the transistor 6*a* is so compensated as to be substantially constant with respect to the oscillator frequency. This is because the variable capacity element 10*a* and the resonance circuit 30*a* have been in effect connected in parallel between the collector and emitter, with respect to the oscillator frequency. With such an arrangement, it is clear that no component having amplitude modulation in accordance with the input signal is mixed into the modulated frequency signal $f_a$.

It will also be understood from the foregoing that a frequency modulated signal without any amplitude-modulated component is likewise obtained from the variable frequency oscillation circuit 5*b*.

The two signals $f_a$ and $f_b$ having been frequency-modulated as described above, are taken out respectively at the output terminals 29*a* and 29*b* of the band-pass filters, 15*a* and 15*b*. In the foregoing, it was shown that there are obtained at the output terminals 29*a* and 29*b* the frequency signals $f_a$ and $f_b$ respectively having frequency deviations of 52.2 to 52.9 mc./s. and 50.0 to 49.3 mc./s. The frequency swing of the video signal 4 is given by a maximum frequency deviation $\Delta f$, namely $$\frac{f_{a2}-f_{a1}}{2}$$

or $$\frac{f_{b1}-f_{b2}}{2}$$

In the present example $\Delta f$=0.35 mc./s., and hence the center frequencies $f_{a0}$ and $f_{b0}$ of the oscillators 5*a* and 5*b* are given by 52.55 mc./s. and 49.65 mc./s. respectively. Consequently there are contained in the frequency modulated signal $f_a$ of the oscillator 5*a*, side band wave components of $(f_{a0}\pm\Delta f)\pm f_m$, $(f_{a0}\pm\Delta f)\pm 2f_m$, $$(f_{a0}\pm\Delta f)\pm 3f_m$$

Figure 3A:
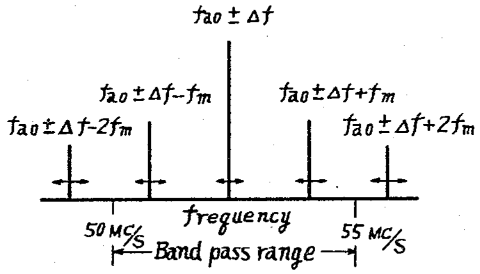
FIGURES 3A and 3B are frequency spectrum diagrams.

. . . such as shown in FIGURE 3A, other than the component of $(f_{a0}\pm\Delta f)$, where the maximum frequency of the video signal, generally between 3 to 4 mc./s., is $f_m$. Similarly there have been included in the frequency modulated signal components of $(f_{b0}\pm\ f)$, $(f_{o0}\pm\Delta f)\pm f_m$, $$(f_{b0}\pm\ f)\pm 2f_m$$

Figure 3B:
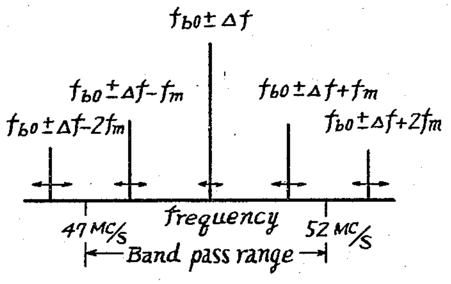
Figure 4:
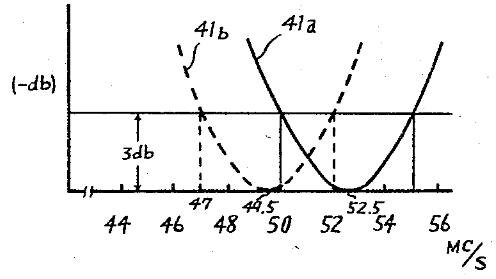
FIGURE 4 shows the attenuating characteristics of a band-pass filter.

. . . such as shown in FIGURE 3B. The primary component $f_m$ is indispensable for transmitting broadband video signals, but second and higher harmonics are unnecessary, since when the frequency modulated signals $f_a$ and $f_b$ of the oscillators 5*a* and 5*b* are mixed as described later, lapped components of the higher side band wave components are so mixed that no faithful low carrier frequency modulated signal is obtained. Therefore the band-pass filters 15*a* and 15*b* are necessary, so as to remove the second or higher side band wave components with respect to $f_m$ from the frequency modulated signals. The staggered and overlapping attenuation characteristics of the band-pass filters are illustrated by the curve 41*a* and 41*b* in FIGURE 4, and the pass bands are selected to be from 50 to 55 mc./s. and from 47 to 52 mc./s. respectively.

The two frequency modulated signals $f_a$ and $f_b$ thus obtained are applied to a mixer circuit 31. The mixer circuit 31 is provided with a transistor 32 and may be formed by connecting the output terminal 29*a* through a coupling condenser 33 to the base of the transistor 32, and the output terminal 29*b* to the emitter. 34 and 35 are resistors for base biasing, 36 is a resistor for the collector and 37 is a resistor for the emitter. To the output of the mixer circuit 31 is connected a low-pass filter 38 of, for example, from 0 to 15 mc./s. passband. Between the base and emitter of the transistor 32 of the mixer circuit 31, the frequency signals $f_a$ and $f_b$ from the oscillation circuits 5*a* and 5*b* are mixed with each other, and thus a low carrier frequency modulated signal $f_{ab}$ of a band pass range of about 6 mc./s. or less is obtained at the output end of filter 38. This frequency modulated signal $f_{ab}$ is supplied to an output terminal 40 through an amplifier 39 and thence to a magnetic head, whereby the low carrier frequency modulated signal can be recorded on a magnetic recording medium.

In this system the low carrier frequency modulated signal $f_{ab}$ is taken out differentially due to beating-down by mixing the high frequency modulated signals $f_a$ and $f_b$ from the two modulation circuits 5*a* and 5*b*, and hence even if non-linearities appear in the variable capacity elements 10*a* and 10*b*, they are compensated by each other so that a low frequency modulated signal of favorable linearity with respect to the video signal may be obtained. As two such modulation circuits 5*a* and 5*b* have been employed, the frequency deviation range in this case may be reduced by half as compared with that of a conventional modulation circuit. Therefore, the present invention is especially characterized in that variable capacity varactor diode elements and transistors may be used in combination in a range of good linearity.

A list of suitable circuit values which may be used to construct an operative circuit as above described is as follows.

Inductors:

| | | |
|---|---|---|
| 13*a*, 13*b* | microhenries | 0.5 |
| 17*a*, 17*b* | do | 0.79 |
| 18*a*, 18*b* | do | 10.0 |
| 20*a*, 20 | do | 20.0 |
| 24*a* | do | 1.0 |
| 24*b* | do | 3.0 |

Capacitors:

| | | |
|---|---|---|
| 8*a*, 8*b*, 9*a*, 9*b* | picofarads | 50 |
| 11*a*, 11*b* | max. picofarads | 25 |
| 14*a*, 14*b* | do | 45 |
| 26*b* | microfarads | 20 |
| 33 | picofarads | 100 |
| 42*b* | do | 500 |

Resistors (values in kilo ohms unless otherwise specified):

| | | |
|---|---|---|
| 12*a*, 12*b* | ohms | 330 |
| 21*a*, 21*b* | | 6.8 |
| 22*a*, 22*b* | | 1.8 |
| 34 | | 27 |
| 35 | | 4.7 |
| 36 | | 1.0 |
| 37 | ohms | 120 |
| 43*b* | | 1.0 |

The foregoing description has been made in connection with an example in which a variable frequency oscillation circuit, namely a frequency modulation circuit, has been composed of a Colpitts-like oscillation circuit, but a Clapp oscillation circuit may also be utilized. Furthermore, it will easily be seen that the two standard frequencies and the frequency deviation ranges therefrom may be varied at will. It will also be understood that the resonance circuit shown as including an inductor for preventing an amplitude modulated component from being produced may be formed of a lumped constant element, and that the band-pass filters may be formed as desired.

It will be apparent that many modifications and variations may be effected without departing from the scope of the novel concept of this invention.

What is claimed is:

1. A frequency modulation circuit characterized by reduced amplitude modulation and side-band components in its output, comprising two variable oscillators of different unmodulated oscillation frequencies, each of said two variable oscillators including a transistor having a base, a cellector and an emitter, and a voltage-variable capacitance element inserted in a circuit including the collector and emitter of each of said transistors, input means for applying identical input signals to both of said two variable capacitance elements, respective tuned circuits resonated near the respective unmodulated frequencies of said oscillators and connected between said input means and said transistors in such a way that they are, at the respective oscillation frequencies, connected effectively in parallel relationship to the respective variable capacitance elements as seen from the collector and emitter of said respective transistors, one of the two variable oscillator frequencies being increased in response to said input signals, while the other is decreased in response to said same input signals, the effective input impedance as seen between the collector and emitter of each transistor being thereby maintained substantially constant with respect to changes in the oscillator frequencies, output means for obtaining a pair of frequency modulated signals from said oscillators, and a mixer circuit for mixing the pair of frequency modulated signals from the output means to provide a frequency modulated signal substantially free from amplitude modulation and the frequency of which is equal to the difference between the frequencies of said pair of frequency modulated signals.

2. A frequency modulation circuit as claimed in claim 1, wherein the variable capacitance elements included in the respective oscillators are connected with opposite polarities to each other with respect to the input means.

3. A frequency modulation circuit as claimed in claim 1, wherein said mixer circuit includes at least one transistor to the emitter and the base of which the frequency modulated signals of said respective output means are respectively supplied.

4. A frequency modulation circuit characterized by reduced amplitude modulation and side-band components in its output, comprising an input terminal for connection to a source of modulating signals, a pair of frequency-deviatable oscillators having different center frequencies and each including a pair of frequency-control terminals, respective frequency-deviating variable-capacitance semiconductor devices connected with opposite polarities in frequency controlling relationship relative to said control terminals, a resonant frequency control connection between said input terminal and each respective one of said devices, said connections including resonant frequency elements tuned to the respective center frequencies of said oscillators, a mixer circuit, stagger-tuned resonant band-pass circuits connected between the outputs of said respective oscillators and the input terminals of said mixer circuit, said band-pass circuits having pass bands which overlap at the desired output center frequency, and a low-pass filter connected to the output of said mixer circuit, whereby the output signal from said low-pass filter is substantially a pure low-sideband-plus-fundamental frequency-modulated carrier; said resonant circuits being effectively in parallel with said respective devices with reference to the frequency-control terminals of said oscillators, so as to compensate for voltage changes across said terminals reflected from freqeuncy changes.

References Cited

UNITED STATES PATENTS

| | | | |
|---|---|---|---|
| 2,526,347 | 10/1950 | Golladay | 332—23 |
| 2,850,631 | 9/1958 | Tillman | 331—48 X |
| 3,188,615 | 6/1965 | Wilcox. | |
| 3,222,459 | 12/1965 | Drapkin | 331—56 X |
| 3,249,897 | 5/1966 | Trilling | 332—24 X |

FOREIGN PATENTS

| | | |
|---|---|---|
| 957,258 | 5/1964 | Great Britain. |

ROY LAKE, *Primary Examiner.*

ALFRED L. BRODY, *Assistant Examiner.*